Patented Sept. 29, 1931

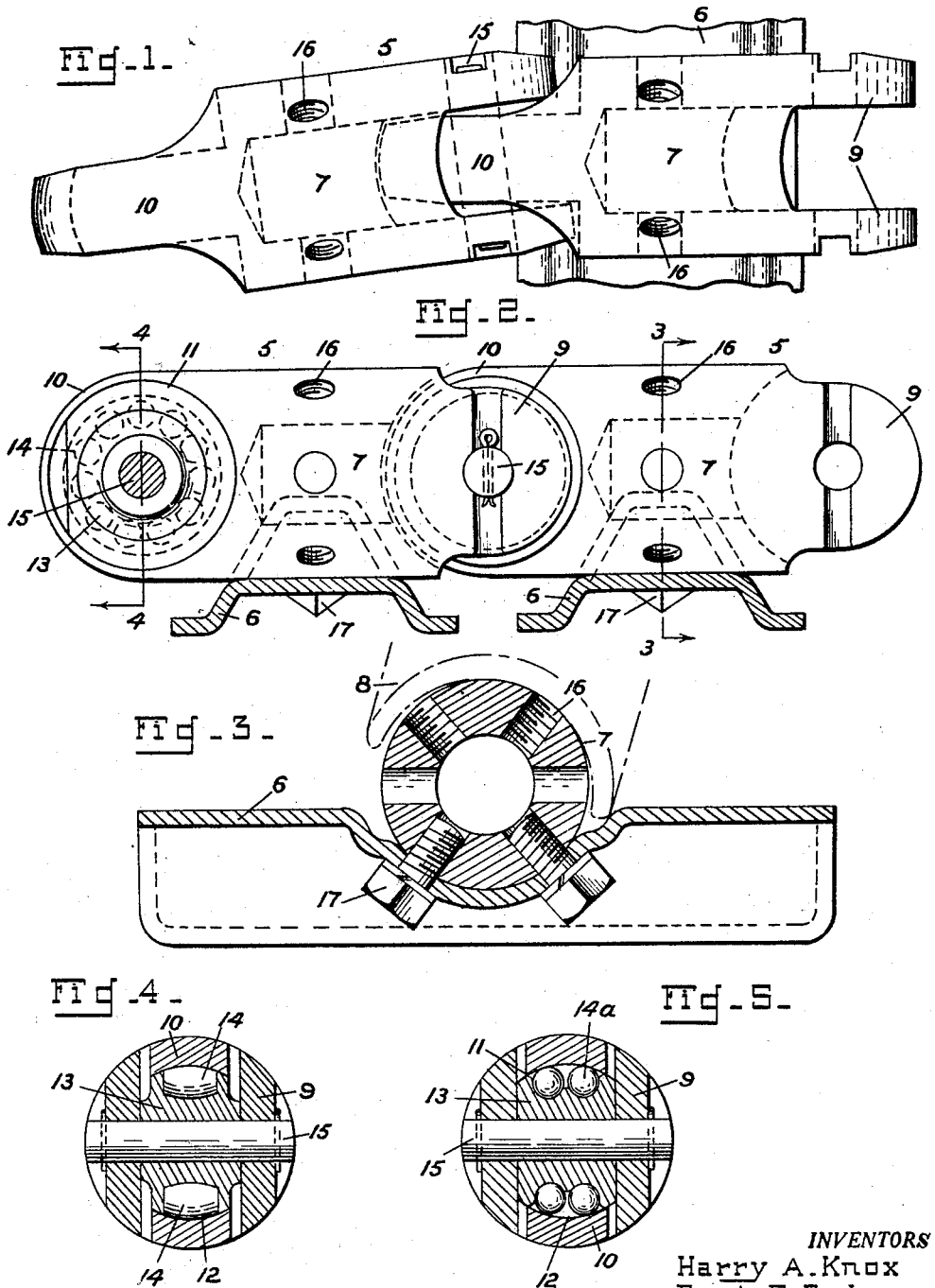

1,825,075

UNITED STATES PATENT OFFICE

HARRY A. KNOX AND BERT F. BAKER, OF DAVENPORT, IOWA

FLEXIBLE TRACK FOR TRACK LAYING VEHICLES

Application filed January 10, 1930. Serial No. 420,025.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to us of any royalty thereon.

The subject of this invention is a flexible track for track laying vehicles and is a substitute for application, Serial No. 5366, filed January 28, 1925.

With the advent of controlled differentials and laterally flexible suspensions in vehicles of the track laying type, it becomes necessary to provide laterally flexible endless tracks which may be laid in a curve when the vehicle is making a turn.

The flexibility obtained by the use of unmodified universal connections for the link sections is objectionable in that the unrestrained axial rotation of the individual link sections interferes with the proper laying of the shoe and rail and causes the driving pins to improperly approach the driving sprocket and idlers.

The principal object of the present invention is to provide a roller or ball bearing universal connection for endless tracks in which the lateral bending and axial rotation of each link section is limited by the structure of its adjacent links. Another object is to provide a mode of attaching the trackway and shoes whereby the trackway may be turned to present a new wearing surface.

To these and other ends, our invention consists in the construction, arrangement and combination of elements, described hereinafter and pointed out in the claim forming a part of this specification.

A practical embodiment of the invention is illustrated in the accompanying drawings, wherein:

Fig. 1 is an inner plan view of a section of a track constructed in accordance with the invention;

Fig. 2 is a view in side elevation thereof, the grousers being shown in section;

Fig. 3 is a sectional view on the line 3—3 of Fig. 2;

Fig. 4 is a sectional view on the line 4—4 of Fig. 2; and

Fig. 5 is a view similar to Fig. 4 in which balls are used instead of rollers.

Referring to the drawings by numerals of reference:

According to the invention, the endless track consists of identical link sections 5 each comprising a shoe or grouser 6 to the inner side of which is secured a cylindrical link 7 constituting a rail or trackway for the support rollers 8 of the vehicle.

Each link 7 is formed with a forked end 9 forming ears between which is received a reduced end or lug 10 on the opposite end of an adjacent link. The reduced end 10 is provided with an aperture 11 defined by a spherical surface 12. Insertible in the aperture 11 is a bushing 13 which upon being inclined or tilted prior to ultimate assembly may receive rollers 14 or balls 14a in a race formed on its periphery. The bushing is secured in the forked end 9 by a pin 15 which when inserted completes the assembly of the joint.

To enable the links 7 to be turned over when they have become worn they are provided with opposite pairs of tapped openings 16 adapted to receive the attaching bolts 17 which are inserted from the under side of the shoes 6.

It will be noted from Figs. 1 and 4 that the lateral bending and axial rotation of each link is controlled by the complementary ends of adjacent links, sufficient clearance being allowed to provide a laterally flexible track within practical limits.

While in the foregoing there has been illustrated and described such combination and arrangement of elements as constitute the preferred embodiment of the invention, it is nevertheless desired to emphasize the fact that interpretation of the invention should only be conclusive when made in the light of the subjoined claim.

We claim:

An endless track embodying a symmetrical sectional trackway, a shoe for each section, and means whereby the shoes may be selectively attached on opposite sides of the track sections.

HARRY A. KNOX.
BERT F. BAKER.